Patented Dec. 6, 1949

2,490,109

UNITED STATES PATENT OFFICE 2,490,109

ALKOXY ISOBUTYRIC ACID DERIVATIVES

Charles Weizmann, London, England, assignor to Polymerisable Products Limited, London, England, a British company No Drawing. Application January 9, 1946, Serial No. 640,129

11 Claims. (Cl. 260—535)

The present invention has reference to the making of certain alkoxy-isobutyric acids and their derivatives (e. g. esters). This application is a continuation in part of my co-pending application Ser. No. 470,360 filed December 28, 1942, (now abandoned).

Previously it was proposed to treat chloretone (a molecular compound or condensation product of chloroform and acetone) with a concentrated aqueous solution of caustic potash and to thereafter add methyl alcohol to the product so produced, and to then boil the mixture. Such a process was stated to yield methyl methacrylate, which could be separated from the other products present by fractional distillation. In said process, the chloretone and the aqueous caustic potash solution were indicated to be at room temperature when mixed together. Such a process is inoperative to produce the result stated, since the said first reaction is so strongly exothermic that the reaction is violent and a too far-going decomposition of the product is produced.

In accordance with the present invention, the reaction is greatly slowed down by greatly limiting the amount of water present (if any), using a great bulk of an aliphatic alcohol in the reaction mixture, and previously strongly refrigerating the alcoholic solutions before mixing the same and regulating the temperature throughout the reaction. Thus the first reaction can be conducted without approaching the high temperatures at which such side reactions (decompositions) can take place.

The present invention has for its object, the safe production of certain alkoxy-isobutyric acids and their derivatives (esters) in yields approaching theoretical.

These acids give the usual derivatives, such as esters of phenylhydrazides. The esterification, for instance, can be carried out with alcohols in the presence of sulphuric acid. Under certain conditions, especially in the case of higher alcohols, this process is accompanied by a substantial conversion into methacrylic acid esters.

It is obviously not essential for the method that the alkyl groups in the alcohol and in the acid radical of the alkoxy-isobutyric acid esters are one and the same.

The following examples of the formation of certain products are given by way of example:

EXAMPLE 1

α-(2-ethyl-hexoxy)-isobutyric acid
(new substance)

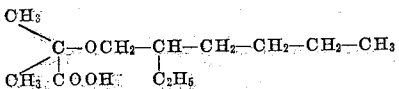

A solution of 71 g. (0.4 mol) acetone-chloroform in 200 cc. 2-ethyl-hexanol at 2° C. was slowly added to the vigorously stirred suspension of 90 g. (1.6 mol) pure potassium hydroxide powder in 400 cc. of 2-ethyl-hexanol at 4° C. The temperature was maintained at 0° to 5° during such addition. The reaction was completed by heating on a steam bath for 2 hours. After filtration of the KCl formed, the clear filtrate was evaporated in vacuo to dryness; the residual salt mixture was treated with a slight excess of dilute sulphuric acid. Worked up in the usual way, 61 g. α-(2-ethyl-hexoxy)-isobutyric acid, i. e. 70.5% of the theoretical amount was obtained. The acid is a colorless liquid of B. P. 141°/12 mm. absolute pressure.

Analysis: from 4.120 mg.: 10.130 mg. $CO_2$ and 4.130 mg. $H_2O$
Found: 67.0% C, 11.2% H
Calc. for $C_{12}H_{24}O_3$: 66.6% C, 11.2% H The liquid mass left by acidifying with an excess of dilute sulphuric acid is filtered, to remove most of the potassium sulphate, and the liberated α-(2-ethyl-hexoxy)-isobutyric acid is extracted from the filtrate by means of a solvent (e. g. ether), and the latter distilled off.

The acid is soluble in alcohols and in aromatic hydrocarbons and only moderately soluble in petroleum hydrocarbons and insoluble in water. At low temperatures it crystallizes in the form of needles.

As a by-product of the reaction, a small amount of 2 - ethyl - hexyl - α - (2 - ethyl - hexoxy)-isobutyrate of B. P. 180–185°/12 mm. was obtained.

Found: 72.5% C, 11.9% H
Calc. for $C_{20}H_{40}O_3$: 73.0% C, 12.2% H

EXAMPLE 2

Butyl ester of α-(2-ethyl-hexoxy)-isobutyric acid (new)

A solution of 100 g. α-(2-ethyl hexoxy)-isobutyric acid (made as in Example 1) in 230 cc. n-butanol, containing 2 g. tannic acid as polymerization inhibitor and 2.3 cc. conc. $H_2SO_4$, as catalyst, was refluxed for 20 hours, during which period equilibrium was reached. The solution was washed with 20% $Na_2CO_3$ solution and dried with $CaCl_2$. Distillation yielded 110 g. n-butyl α-(2-ethyl-hexoxy)-isobutyrate, i. e. 87.37% of the theoretical amount. The ester boiled at 155°/1 Cmm. absolute pressure.

Analysis: 4.485 mg.: 11.650 mg. $CO_2$ and 4.680 mg. $H_2O$

Found: 70.84% C, 11.67% H

Calc. for $C_{16}H_{32}O_3$: 70.65% C, 11.85% H

EXAMPLE 3

Dodecyl ester of α-(2-ethyl-hexoxy)-isobutyric acid (new compound)

40 g. α-(2-ethyl-hexoxy)-isobutyric acid were mixed with 100 g. 1-dodecyl alcohol, 1 g. conc. sulphuric acid, and 1 g. tannic acid and the mixture heated at 120° C. for 24 hours. The reaction flask was connected with a bent condenser so as to remove the water liberated in the esterification. The product was neutralized with calcium carbonate at about 80° and directly fractionated. 51 g. unchanged dodecyl alcohol were recovered in the range between 154 and 200°/10 mm. Then the fraction 200–260°/10 mm. was taken and redistilled. B. P. 232°/10 mm. Yield, 60 g.=86% of the theory. The ester solidified slightly below room temperature and can be recrystallized by precipitation of its acetonic solution with alcohol. The ester is insoluble in alcohol which differentiates it from dodecyl alcohol, but miscible with petroleum ether-acetone mixture.

The term "chloretone" or "acetonechloroform" as used herein, is intended to cover a double compound or condensation product of chloroform and acetone, molar ratio 1:1.

The process as described herein forms the subject matter of a copending application, Ser. No. 70,589, filed Jan. 12, 1949, division being required by the U. S. Patent Office.

I claim:

1. A process of producing an alkali salt of an alkoxy-isobutyric acid which comprises bringing together, at not above 5° C., throughout said step, 1 mol of chloretone with about 4 mols of an alkali metal hydroxide, in the presence of more than 20 mols of an alcohol, any water present being not over 8 mols, the alcohol being in amount greater than the sum of all the other components of said reaction mixture, allowing the mixture to stand at room temperature, and thereafter heating sufficiently to substantially complete the reaction.

2. A process of producing an α alkoxy-isobutyric acid which comprises bringing together at not above 5° C., throughout said step, chloretone with a member of the group consisting of alkali metal hydroxides and alkali metal alcoholates, in the presence of an aliphatic alcohol in the amount of over one half of the entire reaction mixture, and thereafter allowing the reaction to continue for a time at about room temperature, then heating to sufficiently complete the reaction, and thereafter removing the solid potassium chloride formed, and acting upon the reaction product with a mineral acid in amount sufficient to combine with all the alkali present, including that which is in combination with the α alkoxyisobutyric acid.

3. A process of making an α alkoxy isobutyric acid which comprises mixing chloretone with an alcohol and a member of the group consisting of alkali metal hydroxides and alkali metal alcoholates, while at a temperature not substantially above 5° C., during the whole of the mixing step, the amount of the alcohol being over three times the amount of the chloretone, thereafter heating the mixture to boiling, removing solid potassium chloride formed and removing the excess of alcohol, acidifying the reaction product and separating the α alkoxy isobutyric acid from the acidified product.

4. A process which comprises mixing an ice-cold solution of chloretone and an ice-cold solution of potassium hydroxide in an organic alcoholic solvent, while maintaining the temperature during the whole of the said mixing step at a temperature not substantially above 5° C., and thereafter heating the mixture to sufficiently complete the reaction.

5. A process as claimed in claim 4 in which the solvent is ethylene glycol monobutyl ether.

6. A process of making an α alkoxy isobutyric acid which comprises adding a solution of chloretone in an alcohol to a mixture containing an alcohol and a member of the group consisting of alkali metal hydroxides and alkali metal alcoholates, such addition being conducted at a temperature not substantially above 5° C., and the alcohol in said reaction mixture being in amount more than the sum of all the other components of the reaction mixture, then keeping the mixture at about room temperature for a substantial period of time, then refluxing the mixture for a substantial period of time, then removing the solid alkali metal chloride from the mixture, acidifying the mixture, and separating the α alkoxy isobutyric acid from the acidified product.

7. A process of making an α alkoxy isobutyric acid which comprises adding a solution of chloretone in an aliphatic alcohol to a solution of an alkali metal hydroxide in an aliphatic alcohol, the ratio of alcohol to chloretone being over 3.5:1 by weight, all of such addition being made while the reaction mixture is at about 0° C., thereafter boiling the mixture for sufficiently completing the reaction, acidifying the reaction mixture and separating the α alkoxy isobutyric acid therefrom.

8. A process which comprises mixing together solutions of chloretone and of a member of the group consisting of alkali metal hydroxides and alkali metal alcoholates, both dissolved in 2-ethyl-hexanol, and maintaining the reaction mixture at not above 5° C. during the whole of such mixing step, and thereafter heating the mixture sufficiently to substantially complete the reaction, and separating solid alkali chloride from the reaction product.

9. A process which comprises mixing solutions of chloretone and of a member of the group consisting of alkali metal hydroxides and alkali metal alcoholates, in an excess of an alcohol containing an ethylenic linkage, and during the whole of said mixing step keeping the reaction mixture at a temperature not substantially above 5° C., thereafter allowing the mixture to stand at room temperature for several hours, separating solid alkali chloride from the reaction mixture, and thereafter acidifying the reaction mixture with a mineral acid.

10. A process which comprises mixing solutions of chloretone and of a member of the group consisting of alkali metal hydroxides and alkali metal alcoholates, in an ethylene glycol monoalkyl ether, and maintaining the solution at a temperature not substantially above 5° C., during all of such mixing step, and thereafter heating the reaction mixture to about 100° C. until the reaction is sufficiently completed, removing the solid alkali chloride from the reaction mixture and treating the rest of the reaction mixture with a dilute mineral acid.

11. As a new product, α-(2-ethyl-hexoxy)-isobutyric acid, this being a colorless liquid boiling at about 141° C. under 12 mm. absolute pressure.

CHARLES WEIZMANN.

REFERENCES CITED

The following references are of record in the file of this patent:

UNITED STATES PATENTS

| Number | Name | Date |
|---|---|---|
| 2,226,645 | Thomas et al. | Dec. 31, 1940 |
| 2,280,790 | Bruson | Apr. 28, 1942 |
| 2,352,641 | Kung | July 4, 1944 |
| 2,387,735 | Bersworth | Oct. 30, 1945 |

OTHER REFERENCES

Hell et al., "Ber. Deut. Chem., vol. 10, 449 (1877).

Polstorff et al., Berichte (Deutsch. Chem. Gesell.), vol. 45, pp. 1905–1912 (1912).

Banti, Gazz. Chim. Ital., vol. 59, pp. 819–824 (1929).

Certificate of Correction

Patent No. 2,490,109                                                           December 6, 1949

CHARLES WEIZMANN

It is hereby certified that errors appear in the printed specification of the above numbered patent requiring correction as follows:

Column 3, line 52, beginning with "1. A process of producing" strike out all to and including the words and period "dilute mineral acid." in column 5, line 14, comprising claims 1 to 10 inclusive; same column 5, line 15, strike out the numeral and period "11." before the remaining claim; in the heading to the printed specification, line 8, for "11 Claims" read *1 Claim*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*